(12) United States Patent
Andre et al.

(10) Patent No.: US 7,086,679 B2
(45) Date of Patent: Aug. 8, 2006

(54) MOTOR VEHICLE BODYWORK ASSEMBLY

(75) Inventors: Gerald Andre, Amberieu en Bugey (FR); Hugues Cheron, Meximieux (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 11/148,003

(22) Filed: Jun. 8, 2005

(65) Prior Publication Data

US 2006/0012203 A1    Jan. 19, 2006

(30) Foreign Application Priority Data

Jun. 8, 2004    (FR) .................................. 04 06191

(51) Int. Cl.
 *B62D 27/00* (2006.01)
(52) U.S. Cl. ........................................ 296/29; 293/155
(58) Field of Classification Search ................ 296/198, 296/29; 293/154, 155
See application file for complete search history.

(56) References Cited

U.S. PATENT DOCUMENTS

| | | | | |
|---|---|---|---|---|
| 6,135,517 A | * | 10/2000 | Cordebar | 293/154 |
| 6,209,940 B1 | * | 4/2001 | Jocher et al. | 296/29 |
| 6,715,764 B1 | * | 4/2004 | Delavalle et al. | 296/198 |
| 2002/0163216 A1 | | 11/2002 | Delavalle | |
| 2005/0062308 A1 | * | 3/2005 | Pfister et al. | 296/29 |

FOREIGN PATENT DOCUMENTS

WO    WO 0222403    3/2002

* cited by examiner

*Primary Examiner*—Jason Morrow
(74) *Attorney, Agent, or Firm*—James R. Williams

(57) ABSTRACT

A bodywork assembly is described that facilitates joining of a fender and a bumper skin. The edges of the fender and bumper skin include complimentary shapes that mate when the fender and bumper skin are pressed together. A plurality of studs transects the fender and bumper skin along their edges. The studs may be fusible or elastic. In the event of an impact of sufficient magnitude, the studs break or stretch to accommodate deformation, thereby reducing damage to the fender and bumper skin.

9 Claims, 1 Drawing Sheet

MOTOR VEHICLE BODYWORK ASSEMBLY

The present invention relates to an assembly of two pieces of motor vehicle bodywork that are to be juxtaposed and flush with each other.

BACKGROUND OF THE INVENTION

Document EP 1 251 284 discloses a system for assembling a fender and a bumper skin that ensures that those two parts are put accurately into position relative to each other. That system comprises an edge on the bumper skin and an edge on the fender, which edges are designed to bear against each other, together with an assembly strip.

The edge of the bumper skins has studs while the edge of the fender is provided with windows through which the tenons pass when the two edges are pressed against each other.

The assembly strip presses against the edge of the fender, against its face facing away from the edge of the bumper skin, and it is secured to the tenons that pass through the window so as to hold the two edges against each other.

That mechanism unites the fender and the bumper skin and ensures that there is zero or constant clearance maintained between the parts, and also ensures that they are flush.

Under such circumstances, the studs may be molded integrally with the fender or they may be fitted thereto, in which case they may be carried by a support piece snap-fastened to the fender.

However, in order to connect the fender to the bumper skin on the vehicle, it is necessary to make use of additional parts requiring specific fasteners that cannot be omitted.

OBJECTS AND SUMMARY OF THE INVENTION

The present invention seeks to improve the above-outlined system in order to ensure simultaneously that two bodywork parts are made flush with each other and that they are fastened to the structure of the vehicle.

The present invention provides a bodywork assembly comprising:

first and second bodywork parts, each bodywork part having an outside face and an edge, the edges of the two parts being shaped in such a manner as to be capable of pressing against each other in a reference position such that the outside faces of the two parts lie flush with each other; and a presser suitable for holding the two edges pressed against each other in the reference position;

wherein the presser comprises two bearing surfaces that are united by clamping means, suitable for being sandwiched on the two edges pressed against each other, one of the bearing surfaces being provided with fastener means for fastening to the structure of a vehicle.

In a particular embodiment of the invention, a first one of the bearing surfaces is provided with studs, while a second one of the bearing surfaces is shaped to hold said studs and clamp together the two edges of the bodywork part, said two edges having through passages for the studs.

The studs are preferably suitable for breaking in the event of an impact. Under such circumstances, the studs are also said to be "fusible", and their aptitude for breaking makes it possible to preserve the bodywork parts in the event of an impact.

Advantageously, the second bearing surface is shaped to hold the studs by elastic deformation. Thus, in the event of an impact, the second bearing surface can deform again and release the studs without breaking or destroying the studs, thus enabling the two bodywork parts to separate in order to better accommodate any displacements that might result from the impact. Consequently, the entire bodywork assembly can be preserved.

In a particular embodiment of the invention, the edge of the first part includes projections, while the edge of the second part includes housings dimensioned and positioned in such a manner that when the two edges are in the reference position, the projections are engaged in the housings and hold the outside faces flush with each other.

In this embodiment, the two bodywork parts are put into position relative to each other by direct action between the two parts, thereby reducing any chain of dimensions and accumulation of tolerance ranges. In addition, by placing the projections and the housings close to outside faces, and preferably by increasing the number thereof, the tolerance ranges are further reduced, as are the risks of expansion, thereby further improving the extent to which the two outside faces of the parts are caused to be flush.

In a particular embodiment of the invention, the housings are openings formed through the thickness of the edge of the second part.

Thus, the housings are made in the second part merely by providing openings that can either be obtained directly by molding, or that can be obtained during an operation of trimming the second part.

When the parts are made of plastics material, it is advantageous to make the projections and the openings directly during molding.

In a particular embodiment of the invention, the edge of each part is substantially perpendicular to the outside face of the same part, which corresponds to a conventional disposition for the edge on each part.

In a particular embodiment of the invention, one of the two bearing surfaces includes snap-fastener means for snap-fastening with one of the bodywork parts, thus making it possible to mount it in advance on said first bodywork part, e.g. on the fender.

In a particular embodiment, in order to make it easier to engage the projections in the housings, one of the bearing surfaces of the presser includes retaining means for temporarily retaining the second bodywork part in a ready position, in which the two edges are spaced apart but in which each projection is in register with the corresponding housing, such that the projections can be engaged in the housings merely by moving the two edges towards each other in a direction that is substantially perpendicular to said edges.

In conventional manner, the projections have respective ends and the housings have respective openings of frustoconical shape for centering purposes, thereby facilitating engagement.

BRIEF DESCRIPTION OF THE DRAWINGS

In order to make the invention better understood, there follows a description of an embodiment given purely by way of example that does not limit the scope of the invention, and that is made with reference to the accompanying drawing, in which.

MORE DETAILED DESCRIPTION

Figure 1:
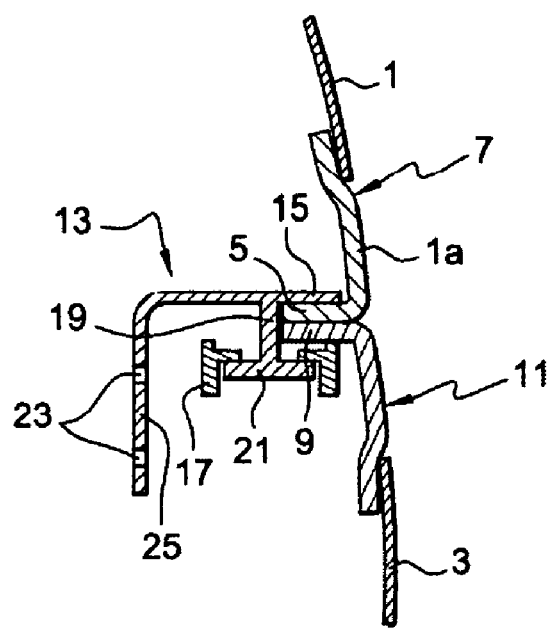
FIG. 1 is a cross-section of an assembly of the invention.

FIG. 1 shows a fender 1 and a bumper skin 2. The fender is made of plastics material. It has a bottom end 1*a,* an edge 5, and an outside face 7.

The advantage of using a plastics material is that it makes it easier to produce the assembly shapes as described below.

The bumper skin 3 is made of plastics material and also has an edge 9 and an outside face 11.

The edges 5 and 9 of the fender and of the bumper skin are shaped in such a manner as to be capable of being pressed against each other in a reference position (shown in FIGS. 1 and 2) in which the outside faces 7 and 11 of the fender and of the bumper skin are flush with each other.

The assembly shown also comprises a presser 13 constituted by a first bearing surface 15 for placing above the edge 5 of the fender and by a second bearing surface 17 constituted by a strip that is for placing beneath the edge 9 of the bumper skin.

The two bearing surfaces 15 and 17 sandwich between them the two edges 5 and 9 that are pressed against each other. The strip constituting the second bearing surface is connected to the first bearing surface 15 by T-section studs 19 secured to the first bearing surface 15 and having enlarged heads 21 for holding the strip 17.

In FIG. 1, it can be seen that when the strip 17 is in position on the studs 19, the two edges 5 and 9 of the fender and of the bumper skin are securely held against each other by being clamped between the two bearing surfaces of the presser.

The studs 19 are preferably distributed in regular manner along the first bearing surface. The number of studs is determined by the person skilled in the art as a function of the shape of the edges and of the stresses to which they are be subjected while the vehicle is in use.

In order to obtain accurate positioning between the fender and the bumper, it is desirable to increase the number of studs by having them as close as possible to one another so as to establish almost continuous connection between the strip 17 and the bearing surface 15.

As can be seen in the drawing, the first bearing structure 15 is provided with fastener means for fastening to the structure of the vehicle. In the example shown, these means are through orifices 23 for receiving screws enabling a limb 25 of the first bearing surface to be screwed to a structural part of the vehicle (not shown) that provides a vertical bearing surface.

Figure 2:
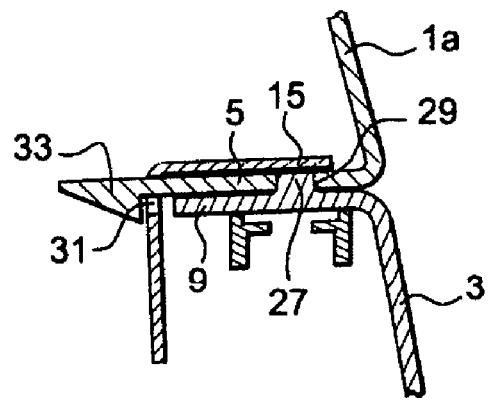
FIG. 2 is a cross-section of the FIG. 1 assembly in another plane.

As can be seen in FIG. 2, the edge 9 of the bumper skin has projections 27 of height that substantially doubles the thickness of the edge in the location of a projection (compared with the thickness of the edge away from the projections). The edge 5 of the fender includes openings 29 arranged through its thickness. Each opening 29 defines a housing suitable for receiving a projection engaged therein.

The projections 27 are of transverse dimensions suitable for coinciding with the openings 29 so that the projections when engaged in the openings ensure that the fender and the bumper skin are accurately positioned relative to each other.

As can be seen in FIG. 2, this position referred to as a reference position provides a good flush configuration between the outside face 7 of the fender and the outside face 11 of the bumper skin.

As can also be seen in FIG. 2, the projection 27 is slightly frustoconical in shape so as to ensure that it is centered in the corresponding opening 29.

Furthermore, the first bearing surface 15 includes snap-fastening means for engaging the fender 1, said means being in the form of an orifice 31 through the limb 25 for receiving a snap-fastening tab 33 of the fender.

These snap-fastening means 31 and 33 enable the first bearing surface 15 to be prepositioned on the fender and brought to the vehicle together with the fender.

Figure 3:
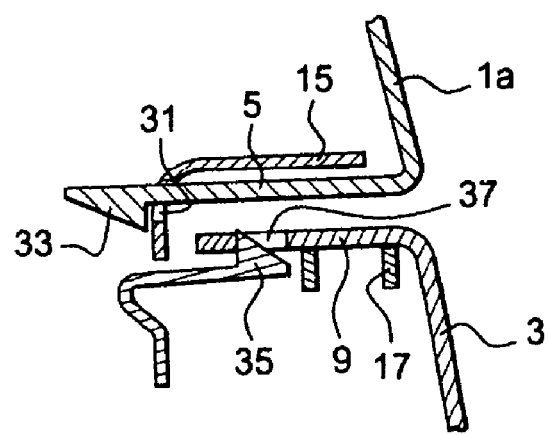
FIG. 3 is a section analogous to FIGS. 1 and 2, taken in another plane.

As shown in FIG. 3, the first bearing surface 15 also includes retaining means for temporarily retaining the edge 9 of the bumper skin in register with the edge 5 of the fender, in a ready position in which each projection 27 is in register with the corresponding housing 29 but is not engaged therein. In this ready position, the two edges 5 and 9 are spaced apart, but the engagement of the projections in the housings is achieved merely by moving the two edges towards each other in a direction that is substantially perpendicular to said edges, i.e. the direction for clamping the two edges together by means of the two bearing surfaces 15 and 17 of the presser.

The temporary retaining means shown in FIG. 3 comprise a snap-fastening tab 35 on the first bearing surface and a snap-fastening opening 37 in the edge 9 of the bumper skin.

From FIG. 3, it can be understood that by moving the edge of the bumper skin upwards so as to press it against the edge of the fender, the projections are engaged in the housings 29 and the two edges 5 and 9 are placed in the reference position. All that then remains to be done is to insert the strip under the heads 21 of the studs 19 so as to hold the two edges 5 and 9 in their reference position, thus ensuring a good flush configuration between the outside faces of the fender and of the bumper skin.

This flush configuration is not sensitive to possible dimensional defects of the presser since it is determined by the projections and the housings that are carried directly by the fender and by the bumper skin. In addition, the projections and the housings are positioned on the edges close to the outside faces 7 and 11 of the fender and of the bumper skin, so that in the event of differential expansion between those two parts, the resulting geometrical offset remains very small.

It should be observed that the studs 19 are shaped so as to avoid being broken in the event of small impacts at low speed, of the kind generally referred to as parking impacts.

However, the studs 19 are shaped so as to rupture at their bases in the event of impact at higher speed, generally referred to as insurance impacts. The snap-fastener means 31, 33 are also adapted to be torn out during such impacts. Thus, in the event of an insurance impact, the bodywork parts 1 and 3 are preserved, being entrained by the impact independently of each other.

What is claimed is:

1. A motor vehicle bodywork assembly comprising:
   first and second bodywork parts, each bodywork part having an outside face and an edge, the edges of the two parts being shaped in such a manner as to be capable of pressing against each other in a reference position such that the outside faces of the two parts lie flush with each other; and
   a presser suitable for holding the two edges pressed against each other in the reference position;
   wherein the presser comprises two bearing surfaces that are united by clamping means, suitable for being sandwiched on the two edges pressed against each other, one of the bearing surfaces being provided with fastener means for fastening to the structure of a vehicle, a first one of the bearing surfaces is provided with studs, while a second one of the bearing surfaces is shaped to hold the studs and clamp together the two edges of the bodywork part, the two edges defining passages for the studs.

2. An assembly according to claim 1, in which the second bearing surface is shaped to hold the studs by elastic deformation so that an impact causes the second bearing surface to deform and release the studs without breaking.

3. An assembly according to claim 1, in which the studs are suitable for breaking in the event of an impact.

4. An assembly according to claim 1, in which the edge of the first part includes projections, while the edge of the second part includes housings dimensioned and positioned in such a manner that when the two edges are in the reference position, the projections are engaged in the housings and hold the outside faces flush with each other.

5. An assembly according to claim 4, in which the projections and the housings are located proximally to the outside faces.

6. An assembly according to claim 5, in which the housings are openings formed through the thickness of the edge of the second part.

7. An assembly according to claim 1, in which the edge of each part is substantially perpendicular to the outside face of the same part.

8. An assembly according to claim 1, in which one of the two bearing surfaces includes snap-fastener means for snap-fastening with one of the bodywork parts.

9. An assembly according to claim 8, in which one of the bearing surfaces of the presser includes retaining means for temporarily retaining the other bodywork part in a ready position, in which the two edges are spaced apart, but each projection lies in register with the corresponding housing, such that the projections are engaged in the housings merely by moving the two edges towards each other in a direction that is substantially perpendicular to the edges.

* * * * *